United States Patent
Choi et al.

(10) Patent No.: US 6,927,607 B2
(45) Date of Patent: Aug. 9, 2005

(54) INVERTER DRIVER AND METHOD

(75) Inventors: Jae-Soon Choi, Seoul (KR); Jea-Gon Seo, Bucheon (KR); Dong-Young Huh, Bucheon (KR); Dong-Hee Kim, Incheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 0 days.

(21) Appl. No.: 10/637,176

(22) Filed: Aug. 8, 2003

(65) Prior Publication Data

US 2004/0105287 A1 Jun. 3, 2004

(30) Foreign Application Priority Data

Aug. 19, 2002 (KR) ................................ 10-2002-0048949

(51) Int. Cl.$^7$ ............................................... H03K 3/00
(52) U.S. Cl. ............................ 327/108; 363/13; 363/16
(58) Field of Search ................................ 327/108–112; 363/13, 16, 55, 56.01, 56.03, 56.04; 315/291, 306, 307

(56) References Cited

U.S. PATENT DOCUMENTS 5,640,313 A * 6/1997 Takehara et al. .............. 363/97

* cited by examiner

Primary Examiner—Kenneth B. Wells
(74) Attorney, Agent, or Firm—Sidley Austin Brown & Wood LLP

(57) ABSTRACT

An inverter driver comprises: an inverter circuit including first and second switches, inverting DC components into AC components in response to switching by the first and second switches to drive a load; a control signal supply outputting a first voltage corresponding to a voltage caused by sensing the current flowing to the load, and outputting a second voltage, and a third voltage generated by multiplying the first voltage by a gain; a frequency controller including a capacitor and an oscillator, controlling a first current charged in/discharged from the capacitor through the oscillator in response to the first voltage; and a duty controller comparing the third voltage and a fourth voltage charged in the capacitor, and controlling the duty of the first and second switches.

21 Claims, 3 Drawing Sheets

INVERTER DRIVER AND METHOD

CROSS REFERENCE TO RELATED APPLICATION

This application is based on Korea Patent Application No. 2002-48949 filed on Aug. 19, 2002 in the Korean Intellectual Property Office, the content of which is incorporated herein by reference.

BACKGROUND OF THE INVENTION (a) Field of the Invention

The present invention relates to an inverter driving device and method. More specifically, the present invention relates to an inverter driving device and method for frequency and duty control.

(b) Description of the Related Art

In general, a backlight used as a light source of an LCD uses a fluorescent lamp to configure a surface light source with uniform brightness. A CCFL (cold cathode fluorescent lamp) of a small size and enabling high-luminance light emission is generally used for the fluorescent lamp.

Conventional inverter drivers have a controller for controlling the current flowing to the CCFL so as to uniformly maintain the brightness of the backlight.

When an input voltage of the inverter driver or a load at the CCFL is varied, the current flowing to the CCFL is varied to change the brightness of the backlight. Therefore, the conventional inverter drivers include a control signal supply for sensing the input voltage and a voltage corresponding to the current flowing to the CCFL to uniformly maintain the current flowing to the CCFL.

The conventional inverter driver uses an output voltage of the control signal supply to control the current flowing to the CCFL by using one of a duty control method and a frequency control method.

The inverter driver according to the conventional duty control method controls switching states of first and second switches coupled in series between the input voltage and the ground voltage to reduce the duty when the input voltage rises or the current flowing to the CCFL is high, and output a duty-increased pulse signal when the input voltage falls or the current flowing to the CCFL is low. A transformer converts the pulse signals to control the current flowing to the CCFL.

However, in the inverter driver according to the conventional duty control method, the current waveform of the CCFL is steeply varied when the duty greatly reduces or increases. Accordingly, the brightness of the CCFL becomes unstable, interference occurs in the adjacent circuit because of many harmonics thereof, and the lifetime of the CCFL shortens.

The inverter driver according to the conventional frequency control method performs control by varying the operation frequency of the current at the CCFL. The inverter driver uses a variable resistor coupled to an oscillator to modify the current flowing to a capacitor coupled to the oscillator, thereby varying the operation frequency of the current of the CCFL.

In this instance, since the conventional inverter driver directly connects the current generated by comparing the reference voltage and the voltage at the load coupled to the CCFL to the variable resistor, it is difficult to control the variation range of the operation frequency. Also, when the CCFL dims, the maximum frequency may rise to 200 KHz which causes an EMI problem, a switching loss problem, and a problem of digressing from the CCFL operation frequency range.

SUMMARY OF THE INVENTION

It is an advantage of the present invention to perform frequency control and duty control in parallel according to variation of the input voltage and the CCFL load.

In one aspect of the present invention, an inverter driver comprises:

an inverter circuit including a first switch and a second switch, for inverting DC components into AC components in response to a switching operation by the first and second switches to drive a load;

a control signal supply for outputting a first voltage corresponding to a voltage caused by sensing the current flowing to the load, and outputting a second voltage, and a third voltage generated by multiplying the first voltage by a predetermined gain;

a frequency controller including a capacitor and an oscillator having a first end coupled to the capacitor, for controlling a first current charged in/discharged from the capacitor through the first end of the oscillator in response to the first voltage, to control the frequency of the oscillator; and a duty controller for comparing the third voltage and a fourth voltage charged in the capacitor, and controlling the duty of the first and second switches in response to comparison results.

In another aspect of the present invention, a driving method of an inverter driver comprising an inverter circuit including a first switch and a second switch, for inverting DC components into AC components in response to a switching operation by the first and second switches to drive a load; a control signal supply for outputting a first voltage corresponding to a voltage caused by sensing the current flowing to the load, and outputting a second voltage, and a third voltage generated by multiplying the first voltage by a predetermined gain; and a frequency controller including a capacitor and an oscillator having a first end coupled to the capacitor, comprises:

controlling a first current charged in/discharged from the capacitor through the first end of the oscillator in response to the first voltage to control the frequency of the oscillator; and comparing the third voltage with a fourth voltage charged in the capacitor, and controlling the duty of the first and second switches in response to comparison results.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
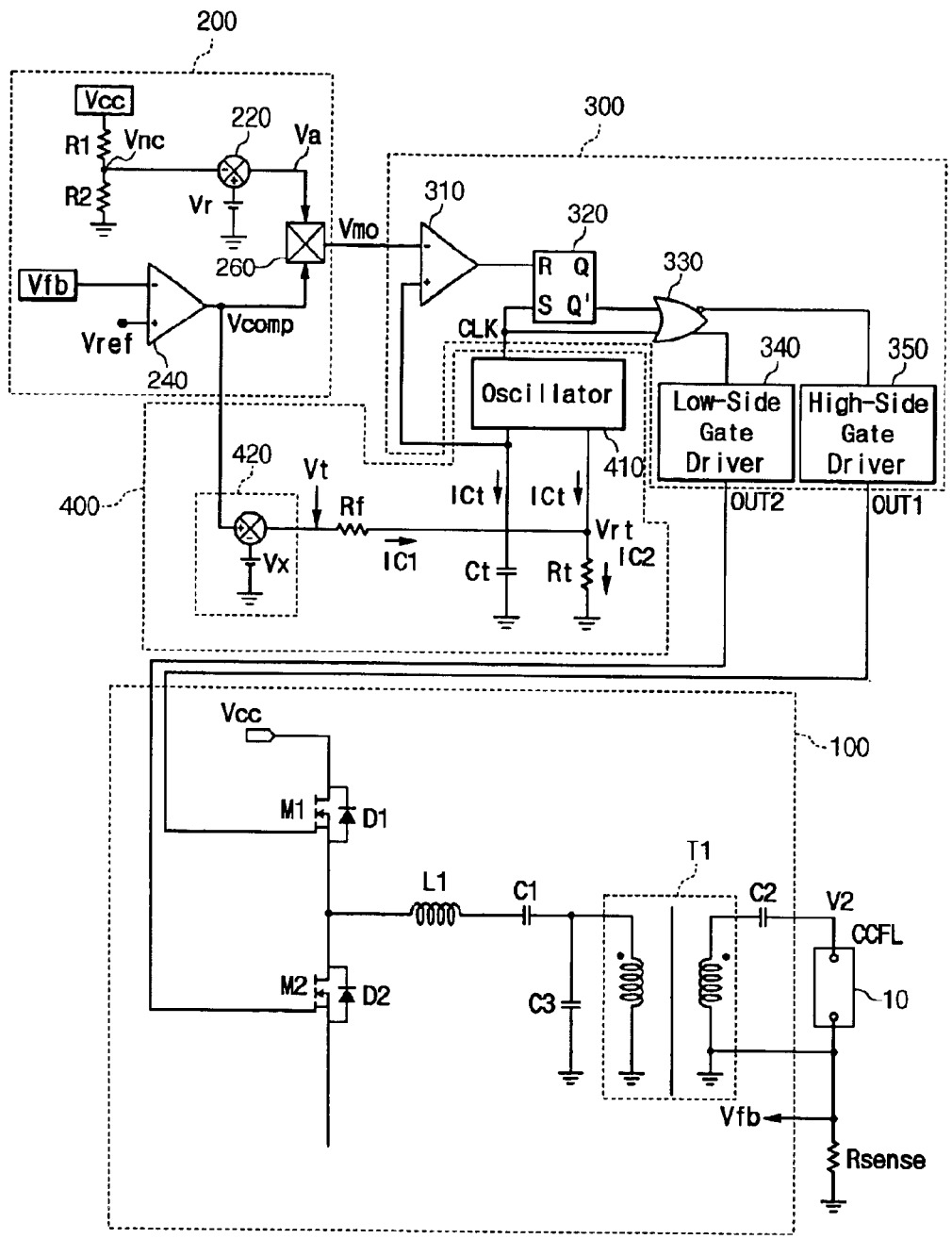
FIG. 1 shows an inverter driver according to a first preferred embodiment of the present invention.

FIG. 1 shows an inverter driver according to a first preferred embodiment of the present invention.

The inverter driver comprises an inverter circuit 100, a control signal supply 200, a duty controller 300, and a frequency controller 400.

The inverter circuit 100 inverts the AC power input according to switching states of switches M1 and M2 to supply it to a CCFL 10 of an LCD backlight. The inverter circuit 100 comprises an inductor L1, primary capacitors C1 and C3, a transformer T1, and a secondary capacitor C2.

The inverter circuit 100 uses a serial/parallel resonance of a half bridge inverter. A resonance frequency of the inverter circuit 100 is a frequency whereby the total impedance of the inductor L1 and the capacitors C1, C2, and C3 becomes zero in the viewpoint from the primary side to the secondary side of the inverter circuit 100.

Body diodes D1 and D2 are respectively coupled to the switches M1 and M2 of the inverter circuit 100. The body diodes enable zero voltage switching of the switches M1 and M2 as described later.

The control signal supply 200 comprises resistors R1 and R2 coupled in series between the input voltage Vcc and ground. A subtractor 220 subtracts a voltage Vnc at a node between the resistors R1 and R2 from a reference voltage Vr and outputting a subtraction voltage Va (Va=Vr−Vnc). A comparator 240 compares a reference voltage Vref and a feedback voltage Vfb at a resistor Rsense sensing the current flowing to the CCFL 10, amplifies the comparison result, and outputs a voltage Vcomp. A multiplier 260 multiplies output signals of the subtractor 220 and the comparator 240 by a predetermined gain K to generate a voltage Vmo, and supplies the voltage Vmo to the duty controller 300.

Therefore, the output voltage Vmo of the control signal supply 200 is given as Equation 1.

$$V_{mo}=K\times V_{comp}\times(V_r-V_{nc})$$ Equation 1

The duty controller 300 comprises a comparator 310, an RS latch 320, an OR/NOR logic gate 330, a high-side gate driver 350, and a low-side gate driver 340.

The comparator 310 compares the output voltage Vmo of the control signal supply 200 with a voltage Vct charged in the capacitor Ct of the frequency controller 400, and provides a comparison result to the R terminal of the RS latch 320. The S terminal of the RS latch 320 receives clock signals CLK from an oscillator 410 of the frequency controller 400. Signals output from the Q' of the RS latch 320 and the clock signals CLK of the oscillator 410 are input to two input terminals of the OR/NOR logic gate 330. Two output signals of the OR/NOR logic gate 330 are respectively provided to the high-side gate driver 350 for driving the switch M1 and the low-side gate driver 340 for driving the switch M2.

The frequency controller 400 comprises an oscillator 410, resistors Rt and Rf, a capacitor Ct, and a subtractor 420.

One end of the resistor Rt is coupled to the oscillator 410, and another end thereof is coupled to the ground voltage. In this instance, a voltage at a node of the oscillator 410 and the resistor Rt is uniformly Vrt volts, and the current IC2 flowing to the resistor Rt is Vrt/Rt.

One end of a resistor Rf is coupled to the node of the oscillator 410 and the resistor Rt, and another end thereof is coupled to the subtractor 420. The subtractor 420 subtracts the reference voltage Vx from the output voltage Vcomp of the comparator 240 of the control signal supply 200. The subtractor 420 is realized by coupling a Zener diode having a voltage Vx or a diode (not illustrated) between the resistor Rf and the voltage Vcomp in series.

When the voltage Vt obtained by subtracting the voltage Vx from the voltage Vcomp is greater than the voltage Vrt, the current IC1 flows to the resistor Rf, and the current ICt which is the difference between the currents IC1 and IC2 (i.e., IC2−IC1 flows to a terminal of the oscillator 410 to which the resistor Rt is coupled.

The capacitor Ct is coupled to the oscillator 410. Since the current flowing to the capacitor Ct is matched with the current ICt, the current ICt charges or discharges the voltage at the capacitor Ct.

In the first preferred embodiment of the present invention, the waveform of the voltage Vct charged in the capacitor Ct is a sawtooth wave having a minimum voltage of 0.25V, and a maximum voltage of 1.75V.

Given an amplitude V of the voltage Vct, the period of the voltage Vct charged in the capacitor Ct is the summation of the charge time (CtxV)/ICt and the discharge time (CtxV)/ICt. Accordingly, the frequency f of the voltage Vct is given as Equation 2.

$$f=ICt/(2Ct\cdot V)$$ Equation 2

An operation of the inverter driver according to the first preferred embodiment of the present invention will now be described with reference to FIGS. 1, 2, and 3.

Figure 2:
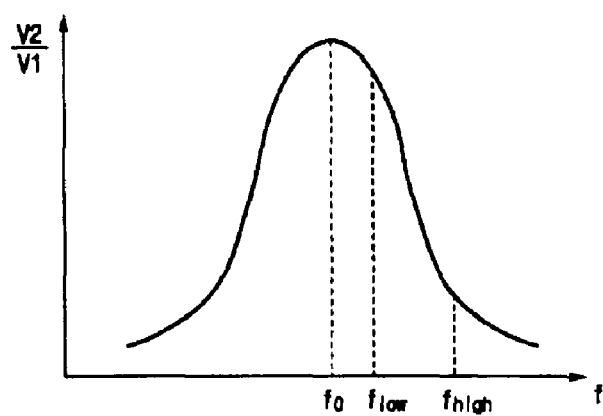
FIG. 2 shows a ratio of a voltage V1 versus a voltage V2, and a relation between a voltage Vct and a frequency fin the inverter circuit.

Referring to FIGS. 1 and 2, a frequency control operation will be described.

FIG. 2 shows a boosting ratio of a voltage V1 versus a voltage V2, and a relation between a voltage Vct and a frequency f in the inverter circuit 100.

The resonance frequency $f_0$ is a frequency when the total impedance of the inductor L1 and the capacitors C1 and C2 becomes zero.

The operation frequency region of the inverter driver is between the minimum frequency $f_{low}$ and tue maximum frequency $f_{high}$. As given in Equation 2, since the capacitor Ct is constant and the amplitude V of the voltage Vct is also constant, the maximum frequency $f_{high}$ is obtained when the current ICt is a maximum, and the minimum frequency $f_{low}$ is obtained when the current Ict is a minimum.

Since ICt=IC2−IC1 and IC2=Vrt/Rt, the ICt becomes the maximum and the frequency of the voltage Vct accordingly becomes the maximum frequency $f_{high}$ when IC1=0. ICt becomes the minimum and the frequency of the voltage Vdt becomes the minimum frequency $f_{low}$ when IC1 is the maximum.

In this instance, the minimum frequency $f_{low}$ is set to be greater than the resonance frequency $f_0$ so that the inverter driver according to the first preferred embodiment may operate in the inductive load. That is, the phase of the current is set to be slower than the phase of the voltage.

When the phase of the current is slower than that of the voltage, the negative current starts to flow before the switch M1 is turned on in the inverter circuit 100, and accordingly, the current flows to the body diode D1. Therefore, since the voltage at both ends of the switch M1 becomes the same before the switch M1 is turned on, zero voltage switching is enabled when it is turned on.

In the like manner, since the positive current flows before the switch M2 is turned on, the current flows to the body diode D2, and the voltage at both ends of the switch M2 becomes the same. Therefore, zero voltage switching is enabled when the switch is turned on.

As derived from FIG. 2, the basic concept of frequency control of the inverter driver according to the first preferred embodiment is to reduce the frequency f and increase the boosting ratio V2/V1 when the voltage Vfb at both ends of the resistor Rsense coupled to the CCFL 10 or the input voltage Vcc reduces, and to increase the frequency f and reduce the boosting ratio when the voltage Vfb or the input voltage Vcc increases, by using the fact that the boosting ratio is maximized when the frequency f of the voltage Vct is the minimum frequency, and the boosting ratio is minimized when the frequency f of the voltage Vct is the maximum frequency.

Therefore, as shown in FIG. 1, when the voltage Vt reduced by the amount of the voltage Vx from the voltage Vcomp through a Zener diode or a diode is greater than the voltage Vrt, the current IC1 flows and the current ICt reduces, and the frequency f of the voltage Vct accordingly reduces as given in Equation 2. Hence, the boosting ratio V2/V1 increases and the voltage Vfb rises.

When the voltage Vfb rises, the voltage Vcomp falls, and the frequency f rises to sustain the voltage Vcomp, thereby maintaining the brightness of the CCFL with no relation to variation of the input voltage Vcc to the CCFL 10.

When the frequency f reaches the maximum frequency $f_{high}$, the voltage Vx is set to make the voltage Vt match the voltage Vrt.

In this instance, when the subtractor 420 is realized using a Zener diode or a diode having the voltage Vx at both ends thereof, the voltage Vt does not become less than the voltage Vrt. Therefore, when the frequency f is equal to the maximum frequency $f_{high}$, no further current IC1 flows, and hence, the frequency f does not become greater than the maximum frequency $f_{high}$.

The reason for controlling the frequency to be under the maximum frequency $f_{high}$ is that if the frequency reaches about 200 KHz, it generates an EMI problem or a switching loss problem. Therefore, the inverter driver sets the frequencies in the suitable range as the maximum frequency to prevent the frequency from exceeding the set limit.

The inverter driver prevents a further increase of the frequency when the frequency f of the voltage Vct reaches the maximum frequency $f_{high}$, and varies the duty to maintain the voltage Vfb. That is, the inverter driver only performs frequency control between the minimum frequency $f_{low}$ and the maximum frequency $f_{high}$, and stops the frequency control and performs duty control when the frequency f reaches the maximum frequency $f_{high}$.

A duty control operation will now be described referring to FIGS. 1 and 3.

Figure 3:
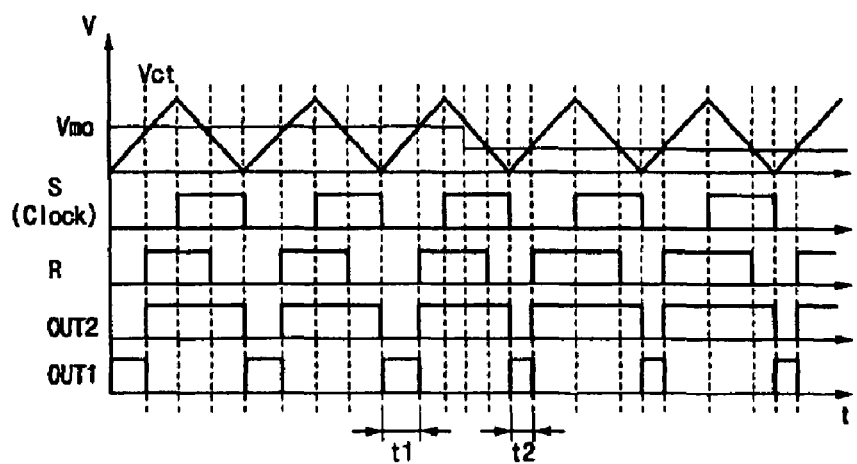
FIG. 3 shows a signal waveform diagram according to a first preferred embodiment of the present invention.

FIG. 3 shows voltage variations of the R and S ends of the RS latch 320, the output end OUT1 of the high-side gate driver 350, and an output end OUT2 of the low-side gate driver 340 according to changes of the output voltage Vmo of the control signal supply 200.

As shown, the clock signals CLK of the oscillator are pulse signals having the same period as the voltage Vct, and they are input to the S end of the RS latch.

Referring to FIG. 1, the voltage Vmo is input to an inverting end of the comparator 310, and the voltage Vct charged in the capacitor Ct is input to a non-inverting end of the comparator 310, and when the voltage Vmo is greater than the voltage Vct, an Off signal is input to the R end of the RS latch 320, and when the voltage Vmo is less than the voltage Vct, an On signal is input to the R end of the RS latch 320.

As shown in FIG. 3, when Off signals are input to the R and S ends of the RS latch 320, the end OUT1 voltage becomes an On signal, and the end OUT2 voltage becomes an Off signal, and in the opposite case, the end OUT1 voltage becomes an Off signal, and the end OUT2 voltage becomes an On signal.

Therefore, when the input voltage Vcc increases, or the voltage Vfb increases because of load variation of the CCFL 10, the voltage Vmo reduces, and accordingly, the pulse width of the end OUT2 voltage reduces to t2 from t1 (i.e., the duty ratio reduces), and the voltage Vfb reduces. Hence, the brightness of the CCFL 10 becomes constant.

In this instance, the duty ratio is controlled to be under 50% for system security.

As described above, since the duty ratio is not greater than 50% in the inverter driver according to the first preferred embodiment, the system becomes stable, and since the frequency of the output signal does not exceed a predetermined frequency range, no EMI problem or switching loss problem occurs.

An inverter driver according to a second preferred embodiment of the present invention will now be described referring to FIG. 4.

Figure 4:
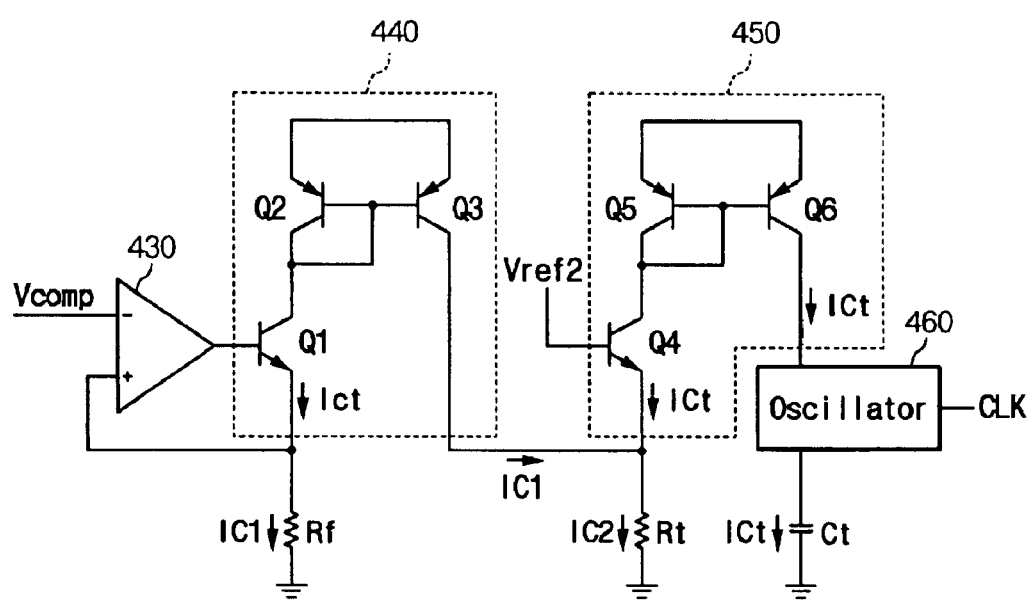
FIG. 4 shows a frequency controller in an inverter driver according to a second preferred embodiment of the present invention.

FIG. 4 shows a frequency controller in an inverter driver according to a second preferred embodiment of the present invention.

The inverter driver according to the second preferred embodiment is matched with that according to the first preferred embodiment except for a frequency controller.

The output voltage Vcomp of the comparator 240 is input to an inverting end of the OP amp 430, and a resistor Rf is coupled between an inverting end of the OP amp 430 and the ground voltage. Since the voltages at the inverting and non-inverting ends of the OP amp 430 are the same, the voltage Vcomp is applied to both ends of the resistor Rf, and the current IC1 flowing to the resistor Rf is Vcomp/Rf.

A current mirror 440 including transistors Q1, Q2, and Q3 is coupled to the output end of the OP amp 430. Since no current is applied to the inverting end of the OP amp 430, the current flowing to the transistor Q1 is the same as the current IC1 flowing to the resistor Rf. Accordingly, the current IC1 flows to the transistor Q3 of the current mirror 440.

When the current mirror 440 is coupled to the resistor Rt, the current IC1 is applied to the resistor Rt. The resistor Rt is coupled to the current mirror 450 including a transistor Q4 having a base end coupled to the voltage Vref2, and transistors Q5 and Q6. Since the voltage applied to the resistor Rt is a voltage (Vref2−Vbe) obtained by subtracting the voltage Vbe between a base and an emitter from the voltage Vref2 applied to the base of the transistor Q4, the current IC2 flowing to the resistor Rt becomes ($V_{ref2}$−Vbe)/Rt.

Therefore, the current ICt flowing to the transistor Q4 is the same as the subtraction of the current IC1 from the current IC2, and accordingly, Equation 3 is given.

$$IC_t = (V_{ref2} - V_{be})/R_t - V_{comp}/R_f \qquad \text{Equation 3}$$

Therefore, the current mirror 450 supplies the current ICt to the oscillator 460.

The current ICt flows to the capacitor Ct coupled to the oscillator 460 to charge and discharge it, and the frequency f of the voltage at the capacitor is given in Equation 2.

As known from Equations 2 and 3, the frequency is the maximum when the voltage Vcomp is the greatest, and the frequency is the minimum when the voltage Vcomp is the least.

An operation of the inverter driver according to the second preferred embodiment of the present invention will be described.

The inverter driver performs duty control and frequency control.

When the input voltage Vcc increases, or when the voltage Vbe increases because of load variation of the CCFL 10 and the voltage Vcomp thus decreases, the current IC1 reduces and the current ICt increases in the frequency controller of FIG. 4, and hence, the frequency f of the voltage Vct increases. Therefore, as known from the relation between the frequency f and the boosting ratio V2/V1 of FIG. 2, the boosting ratio V2/V1 reduces, and the brightness of the CCFL 10 accordingly reduces.

Concurrently, the voltage Vcomp is input to the duty controller 300, and the duty reduces as shown in FIG. 3, and the brightness of the CCFL 10 reduces. The operation of duty control is described in the first preferred embodiment.

As described, since the inverter driver and method thereof concurrently processes the frequency control and duty control according to the input voltage and variation of the CCFL load, the duty is controlled within an appropriate range, the current waveform of the CCFL becomes stable, the harmonics reduce, and hence no interference occurs in peripheral circuits, the maximum frequency reduces, and no EMI problem and switching loss problem are generated.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An inverter driver comprising:
   an inverter circuit including a first switch and a second switch, for inverting DC components into AC components in response to a switching operation by the first and second switches to drive a load;
   a control signal supply that generates a first voltage corresponding to a voltage caused by sensing the current flowing to the load, and that generates a second voltage, wherein a third voltage is generated by multiplying the first voltage by a predetermined gain;
   a frequency controller including a capacitor and an oscillator having a first end coupled to the capacitor, that controls a first current charged in/discharged from the capacitor through the first end of the oscillator in response to the first voltage to control the frequency of the oscillator; and
   a duty controller that compares the third voltage and a fourth voltage charged in the capacitor, and controls the duty of the first and second switches in response to comparison results.

2. The inverter driver of claim 1, wherein the frequency controller comprises:
   a subtractor that subtracts a first reference voltage from the first voltage and outputs a fifth voltage;
   a first resistor having one end coupled to a second end of the oscillator, and another end coupled to the fifth voltage; and
   a second resistor coupled between the second end of the oscillator and a sixth voltage,
   wherein the current flowing to the first end of the oscillator is the same as the current flowing to the second end of the oscillator.

3. The inverter driver of claim 2, wherein in the frequency controller, a second current flowing to the first resistor varies according to the fifth voltage, a third current flowing to the second resistor is constant, and the first current charged in/discharged from the capacitor corresponds to the difference between the second and third currents.

4. The inverter driver of claim 2, wherein the subtractor is a diode coupled to the first voltage and one end of the first resistor.

5. The inverter driver of claim 4, wherein the diode is a Zener diode having the first reference voltage as a breakdown voltage.

6. The inverter driver of claim 2, wherein the sixth voltage is a ground voltage.

7. The inverter driver of claim 1, wherein the frequency controller comprises:
   a first resistor coupled between the first and fifth voltages;
   a first current mirror having a first end coupled to one end of the first resistor, for outputting a current identical with a second current flowing to the first resistor to a second end;
   a second resistor coupled between the second end of the first current mirror and the sixth voltage; and
   a second current mirror having a first end coupled to one end of the second resistor, and a second end coupled to the second end of the oscillator, for supplying the current identical with the first current flowing to the first end to the second end of the oscillator through the second end,
   wherein the currents flowing to the first and second ends of the oscillator are the same.

8. The inverter driver of claim 7, wherein a second current flowing to the first resistor varies according to the fifth voltage, a third current flowing to the second resistor is constant, and the first current flowing to the first end of the second current mirror corresponds to the difference between the second and third currents.

9. The inverter driver of claim 8, comprising an OP amp having a first input end coupled to the first voltage, a second input end coupled to one end of the first resistor, and an output end coupled to a third end of the first current mirror.

10. The inverter driver of claim 8, wherein the fifth and sixth voltages are the ground voltage.

11. The inverter driver of claim 1, wherein the control signal supply comprises:
   a comparator for comparing a voltage generated by sensing the current flowing to the load with the first reference voltage, and outputting the first voltage;
   first and second resistors coupled in series between the input voltage and ground;
   a subtractor for subtracting a voltage at a node between the first and second resistors from a second reference voltage, and outputting the second voltage; and
   a multiplier for multiplying the first voltage output from the comparator and the second voltage output from the subtractor by a predetermined gain, and outputting the third voltage.

12. The inverter driver of claim 1, wherein the duty controller comprises:
   a comparator for comparing the third voltage output from the control signal supply with the fourth voltage charged in the capacitor of the frequency controller;
   a latch circuit for respectively receiving signals from the comparator and clock signals from the oscillator of the frequency controller through first and second input ends, and outputting On/Off signals according to input signals;

a logic operator for respectively receiving output signals from the latch circuit and clock signals from the oscillator through first and second input ends, executing a logic operation based on the received signals, and outputting logic operation results to first and second output ends;

a first gate driver for controlling a switching operation of the first switch of the inverter circuit on the basis of signals output from the first output end of the logic operator; and a second gate driver for controlling a switching operation of the second switch of the inverter circuit on the basis of signals output from the second output end of the logic operator.

13. The inverter driver of claim 1, wherein the load is a lamp of an LCD (liquid crystal display) light.

14. A driving method of an inverter driver comprising an inverter circuit including a first switch and a second switch, for inverting DC components into AC components in response to a switching operation by the first and second switches to drive a load; a control signal supply for generating a first voltage corresponding to a voltage caused by sensing the current flowing to the load, and generating a second voltage as well as a third voltage generated by multiplying the first voltage by a predetermined gain; and a frequency controller including a capacitor and an oscillator having a first end coupled to the capacitor, the method comprising:

(a) controlling a first current charged in/discharged from the capacitor through the first end of the oscillator in response to the first voltage to control the frequency of the oscillator; and (b) comparing the third voltage with a fourth voltage charged in the capacitor, and controlling the duty of the first and second switches in response to comparison results.

15. The driving method of claim 14, wherein the frequency controller comprises:

a first resistor having one end coupled to a second end of the oscillator, and another end coupled to the first voltage; and a second resistor coupled between the second end of the oscillator and a sixth voltage, and (a) comprises changing a second current flowing to the first resistor according to the first voltage, maintaining a third current flowing to the second resistor, and charging in/discharging from the first current corresponding to the difference between the second and third currents to control the frequency of the voltage at the capacitor.

16. The driving method of claim 15, wherein the frequency of the voltage at the capacitor is the maximum when the first current is the maximum.

17. The driving method of claim 16, wherein the second current value is 0 when the frequency is the maximum.

18. The driving method of claim 17, wherein the frequency controller further comprises a subtractor for subtracting a first reference voltage from the first voltage, outputting a fifth voltage, and supplying the fifth voltage to one end of the first resistor.

19. The driving method of claim 18, wherein the subtractor is a Zener diode having the reference voltage as a breakdown voltage.

20. The driving method of claim 14, wherein (a) comprises setting the minimum frequency at the capacitor to be greater than a resonance frequency of the inverter circuit.

21. The driving method of claim 14, wherein the duty control in (b) is performed when the frequency of the voltage at the capacitor reaches the maximum frequency.

* * * * *